United States Patent [19]
deVries

[11] 4,125,589
[45] Nov. 14, 1978

[54] ODOR CONTROL SYSTEM

[75] Inventor: Egbert deVries, Kettering, Ohio

[73] Assignee: Quad Corporation, Highland Park, Ill.

[21] Appl. No.: 649,696

[22] Filed: Jan. 16, 1976

[51] Int. Cl.² ............................................. B01D 53/34
[52] U.S. Cl. ................... 423/245; 423/210; 423/224; 422/5
[58] Field of Search ............... 423/210, 245, 224, 242; 21/55, 58; 55/238, 94, 84

[56] References Cited

U.S. PATENT DOCUMENTS

| | | | |
|---|---|---|---|
| 2,532,554 | 12/1950 | Joeck | 261/1 |
| 2,935,375 | 5/1960 | Boucher | 423/215.5 X |
| 3,353,334 | 11/1967 | Bergman | 55/94 |
| 3,505,788 | 4/1970 | Teller et al. | 55/238 X |
| 3,683,626 | 8/1972 | Merrill | 55/84 X |
| 3,687,630 | 8/1972 | Tailor | 423/242 |
| 3,923,955 | 12/1975 | Fattinger | 423/210 |
| 3,939,251 | 2/1976 | Tsuji | 423/244 |

FOREIGN PATENT DOCUMENTS 1,152,705  5/1969  United Kingdom ........... 423/224

*Primary Examiner*—Earl C. Thomas
*Attorney, Agent, or Firm*—Fidelman, Wolffe & Waldron

[57] ABSTRACT

An apparatus and process for treating gases containing odoriferous constituents is described. The gas is passed through a condenser to remove the condensable materials and the non-condensed portion is then introduced into the top portion treating vessel. There it is contacted with a finely divided aqueous spray having a droplet diameter of up to 10 microns in diameter, whereby odoriferous constituents are removed. The treated gas is removed from the vessel at the bottom through a duct. Outside air may be introduced through a damper to mix with the exit gas, which is substantially saturated with moisture, to lower its dew point.

11 Claims, 1 Drawing Figure

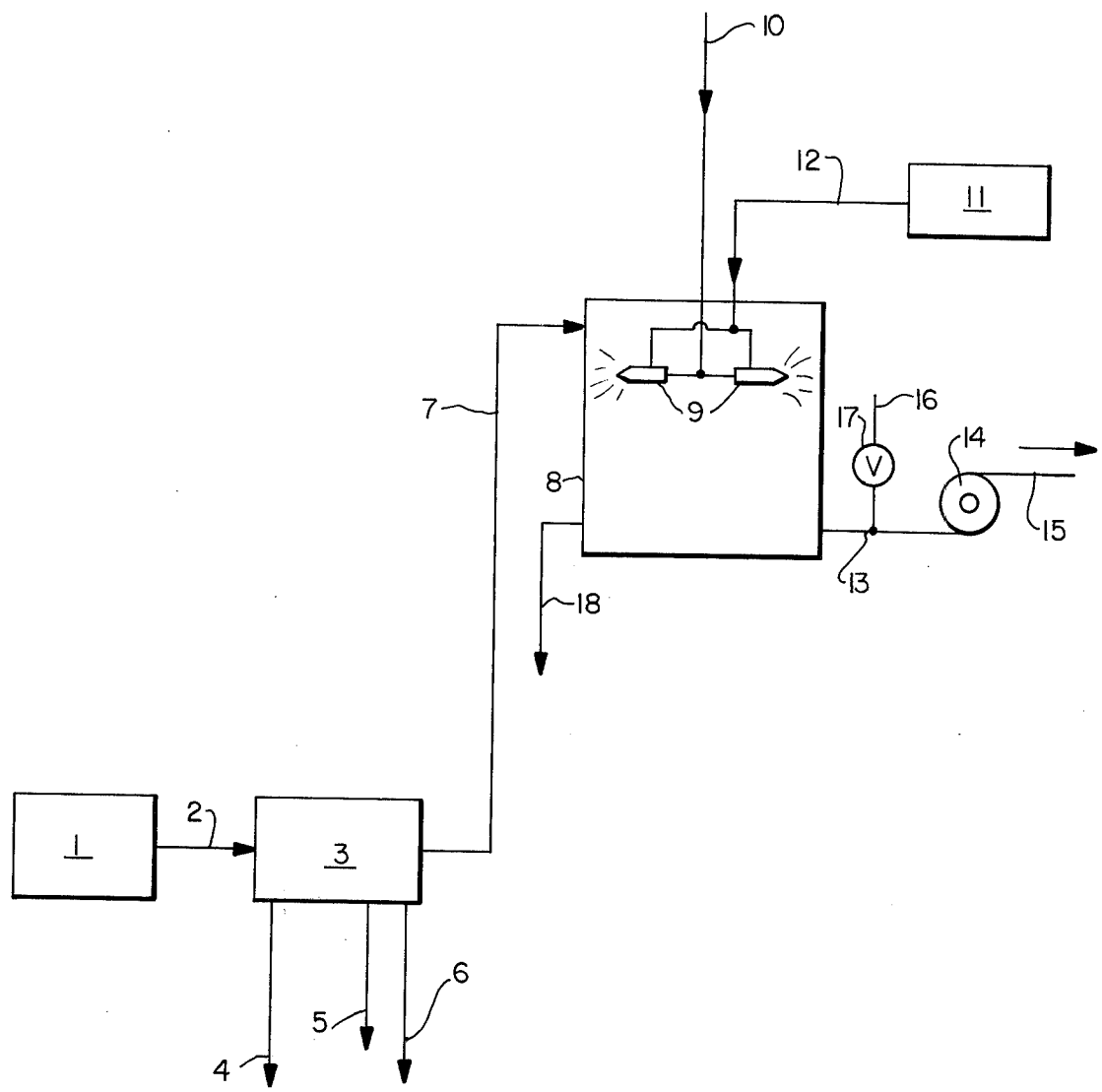

4,125,589

ODOR CONTROL SYSTEM

BACKGROUND OF THE INVENTION

As is well known, rendering plants emit offensive odors. These are required to be eliminated by air pollution regulations of the various governmental jurisdictions wherein a plant is located. Many proposals have been made to eliminate these odors, ranging from a simple water-washing procedure to chemical treatment of the plant off-gases.

A number of these proposals involve absorption treatment in packed towers. While effective, they nevertheless have certain deficiencies in that they have relatively short reaction time, are subject to fouling, and because of their significant pressure drops require relatively large horsepower fans. The presence of packing resulted in the necessity for stronger construction and in a heavier structure, which in turn limits the situs where the purification plant may be located.

Other proposed processes employ spray chambers wherein the droplet size is relatively large, resulting in relatively small droplet area-to-volume ratios. In general, the larger this ratio the greater the total reaction surface and the more effective the scrubbing action.

In contrast to the relative high cost of the prior art methods, the present invention provides a relatively inexpensive system costing a fraction as much for treating offensive gases and vapors from various processing plants. The component elements required for the invention are simple and of lightweight construction which reduces the cost and permits greater flexibility in physical location of the treating system.

Among the objects of the present invention are:

1. To provide a relatively inexpensive and improved method for the removal of foul odors emanating from certain industrial operations such as rendering process plants.
2. To condense the entire condensable fraction of vapors emanating from the plant operation prior to any subsequent chemical treatment.
3. To treat the uncondensed vapors in a non-packed spray tower employing very fine droplets of chemical reactants having a high surface-to-volume ratio.
4. To provide a relatively long reaction time within the spray tower for the uncondensed vapors containing malodorous constituents.
5. To introduce the uncondensed vapors at the top of the spray tower, and remove the treated vapors from the bottom of the tower.
6. To provide a fan to remove the treated vapors from the spray tower.
7. To provide an inlet to admit ambient air into the treated vapors where they exit from the spray tower to lower the dew point.
8. To provide a spray tower which has a very low pressure drop.
9. To provide a spray tower system where fouling is significantly lessened.
10. To provide a spray tower of relatively light weight fiberglass reinforced resin which can be mounted on a roof with but minor structural alterations.

Further objects will become apparent from the specification and claims following.

SUMMARY OF THE INVENTION

This invention treats the vapors emanating from a rendering operation by first passing the effluent gases through a condenser and then leading the uncondensed portion which contain foul-smelling constituents into the top of a spray tower where they are contacted with extremely fine droplets of reactive chemical, e.g. oxidizing agents such as NaOCl in solution. The odoriferous components are converted to inoffensive materials, and are removed from bottom of the tower. Outside air may be admitted into the exit line to lower the dew point of the effluent vapors.

BRIEF DESCRIPTION OF THE DRAWING

The FIGURE is a schematic flow sheet of the process.

DESCRIPTION OF THE PREFERRED EMBODIMENT

In the FIGURE, vapors from a cooker 1 in a rendering process, e.g. a hot continuous inedible rendering process, are led via line 2 to a condenser 3 which can be of standard shell and tube design of corrosion resistant alloys. There cooling water is admitted via line 4 and removed through line 5 as heated water which can be used as process water elsewhere in the plant. Condensed liquids are removed through line 6 for discard or further treatment. About 80 to 85% of the total vapors condense, reducing the volume of gases to be subsequently treated and also helping in drawing the vapors from the cooker to the condenser.

The uncondensed vapors, which contain the malodorous constituents are led via line 7 to the upper portion of spray tower 8. Line 7 enters tower 8 tangentially, so the incoming vapors have a spiral motion. At the upper portion of the tower are a plurality of ultrasonic spray nozzles 9 which have a compressed air feed through line 10. NaOCl oxidizing agent in aqueous solution in reservoir 11 is supplied to the ultrasonic spray nozzles in via line 12. The number of spray nozzles may be varied as deemed necessary. In a fourteen foot tower of ten feet in diameter five nozzles have been found adequate. Ultrasonic spray nozzles are well known and are shown in U.S. Pat. No. 2,532,554 to Joeck, for example.

In removing the odoriferous constituents from vapors emanating from rendering cooler units the art has used water to wash the gases and acids, bases, and oxidizing compounds such as $KMnO_4$ to chemically treat them. Sodium hypochlorite, NaOCl, in aqueous solution and at a concentration having as a broad range from about 10 ppm to as high as 50,000 ppm (a 5% solution), and a narrow preferred range of from about 100 to about 500 ppm with about 200 ppm being the preferred concentration, has been found to be satisfactory for use in the scrubber since it is readily available and is a very powerful chemical oxidizer. The 200 ppm concentration is generally preferred since above this quantity the order of chlorine becomes more noticeable. Other oxidizers such as $KMnO_4$ or $H_2O_2$ for example, may be employed. $KMnO_4$ has the defect, however, of producing a dark precipiate of $MnO_2$. If desired, the other reagents such as those employed by the prior art, acids such as HCl, $H_2SO_4$; bases such as NaOH, etc., may be employed in the system of this invention.

Cleaned up vapors are removed tangentially through line 13 through a pump or fan 14 which provides suction, and are discharged through line 15. Ambient air having a relatively lower moisture content may be admitted via line 16 and valve 17 into the cleaned up vapors to lower the dew point of the latter which are substantially saturated with water at the bottom of the spray tower. Liquids are removed from the tower via drain line 18 and may be discarded or filtered and adjusted for NaOCl content and recycled to the spraying step by means well known to the art.

Among the compounds which contribute to the foul odors in the vapors from the coolers are methyl, methyldiethyl, and propyl sulfides, amines such as trimethyl, butyl, dimethyl, quinoline and methyl pyrizines, and $C_4$-$C_7$ aldehydes, ketones, and alcohols. All of these compounds are reactive to a strong oxidizing agent such as an NaOCl scrubbing solution.

The droplets of NaOCl solution leaving the spray nozzle have a diameter ranging up to 10 microns. By employing such fine droplets the ratio of area-to-volume is optimized. An adequate dwell time is provided for by virtue of the time it takes for the fine droplets to fall unimpeded the length of the tower.

The following Table shows the relative effect of droplet size:

TABLE

| Diameter of droplet in microns | 4 | 10 | 200 | 400 |
|---|---|---|---|---|
| Volume (mm$^3$) | $3.3 \times 10^{-9}$ | $5.23 \times 10^{-7}$ | $41,866 \times 10^{-7}$ | $335,000 \times 10^{-7}$ |
| Relative volume | .07 | 1 | 8000 | 64,000 |
| No. of Droplets/liter | $30 \times 10^{12}$ | $2 \times 10^{12}$ | $2 \times 10^{8}$ | $3 \times 10^{7}$ |
| Area (mm$^2$) | $50 \times 10^{-6}$ | $3.14 \times 10^{-4}$ | $1256 \times 10^{-4}$ | $5000 \times 10^{-4}$ |
| Total area in 1 liter NaOCl solution (mm$^2$) | $15 \times 10^{8}$ | $6 \times 10^{8}$ | $.25 \times 10^{8}$ | $.015 \times 10^{8}$ |
| Coefficient of effectiveness (area:volume) (ratio of droplet of 400 μ diameter droplet taken as 1) | 1000 | 400 | 24 | 1 |

From the table, it is apparent that the very fine ultrasonic droplets of NaOCl solution have a much greater effectiveness than the usual spray droplets employed in ordinary spray towers where the droplet size is in the order of 400 microns in diameter.

The reaction time of the droplet in the spray tower is on the order of 60 seconds for the vapor flow from one vessel. For example, 1000 cu. ft./minute from a cooker would pass through a 1099 cu. ft. spray tower. If the vapors from three vessels would be passed through, the reaction time would be 20 seconds. As compared with the reaction time in many packed column designs which are measured in tenths of seconds, a much longer reaction time is provided. This multiplier factor coupled with the large coefficient of effectiveness results in overall improved capabilities of 4000 to 40,000 times over commercially available systems.

By placing the fan downstream from the scrubber, after the removal of condensables and where only a fraction of the total vapor is remaining to be transported, the horsepower requirements are substantially reduced in contrast to the large horsepower requirements of the prior art. A 10 horsepower drive for a small fan as been found sufficient under the present system to take care of a vapor flow of 1100 cu. ft./minute.

Admitting drier outside air into the exit gas through line 16 into line 13 acts as a simple mist eliminator. In winter ambient temperature room air may be admitted to prevent freeze-up. The mixture of drier air with substantially water saturated vapors from the spray tower can be adjusted to have a lower relatively humidity, thereby permitting a degree of control of the moisture plume in the exhaust.

As stated previously, the warm vapors enter tangentially at the top of the vessel and the scrubbed vapor exit tangentially at the bottom. During the scrubbing process the vapors are cooled slightly and tend to sink. As a result, the hot gases entering at the top are less likely to by-pass the scrubbing action since they are too light and would tend to remain at the upper portion until they are cooled as a result of contact with the droplets and become denser.

What is claimed:

1. A process for treating vapors containing offensive or foul-smelling constituents comprising organic sulfides, amines, aldehydes, ketones, alcohols and the like; which comprises
    passing the vapors through a condensing zone to remove condensable constituents from said vapors;
    treating said uncondensed vapors in a spray treatment zone, said treatment consisting of the following steps:
    (a) passing the uncondensed vapors into the upper region of a spray treatment zone;
    (b) introducing into the upper portion of said treatment zone a finely divided spray consisting essentially of water and an oxidising agent and having a droplet diameter of up to about 10 microns;
    (c) allowing the droplets to fall unimpeded through the spray treatment zone for at least about 20 seconds whereby offensive or foul-smelling constituents are removed from said vapor;
    (d) removing treated vapor from the lower portion of the treatment zone, and;
    (e) separately removing settled out spray liquid, now containing said offensive and foul-smelling material, from the lower portion of the treatment zone.

2. The method of claim 1 wherein the uncondensed and the treated vapors are respectively introduced and removed tangentially from the spray treatment zone.

3. The method of claim 2 wherein the spray comprises NaOCl having a concentration of from about 10 to about 50,000 ppm in aqueous solution.

4. The method of claim 3 wherein the NaOCl has a concentration of from about 100 to about 500 ppm.

5. The method of claim 4 wherein the NaOCl has a concentration of 200 ppm.

6. The method of claim 2 wherein the treated vapors are removed from the treatment zone through an exit line and suction is applied to said vapors within said line at a location outside said zone to aid in moving the vapors through the condensing and treatment zones.

7. The method of claim 6 wherein the aqueous spray comprises NaOCl having a concentration of from about 100 ppm to about 500 ppm in aqueous solution.

8. The method of claim 7 wherein the NaOCl has a concentration of about 200 ppm.

9. The method of claim 6 wherein ambient air containing less moisture than the treated vapors is introduced into the exit line at a location between the treatment zone and the suction location to lower the dew point of the treated vapors removed from the treatment zone.

10. The method of claim 9 wherein the aqueous spray comprises NaOCl having a concentration of from about 100 to about 500 ppm in aqueous solution.

11. The method of claim 10 wherein the NaOCl has a concentration of about 200 ppm.

* * * * *